Figure 1:
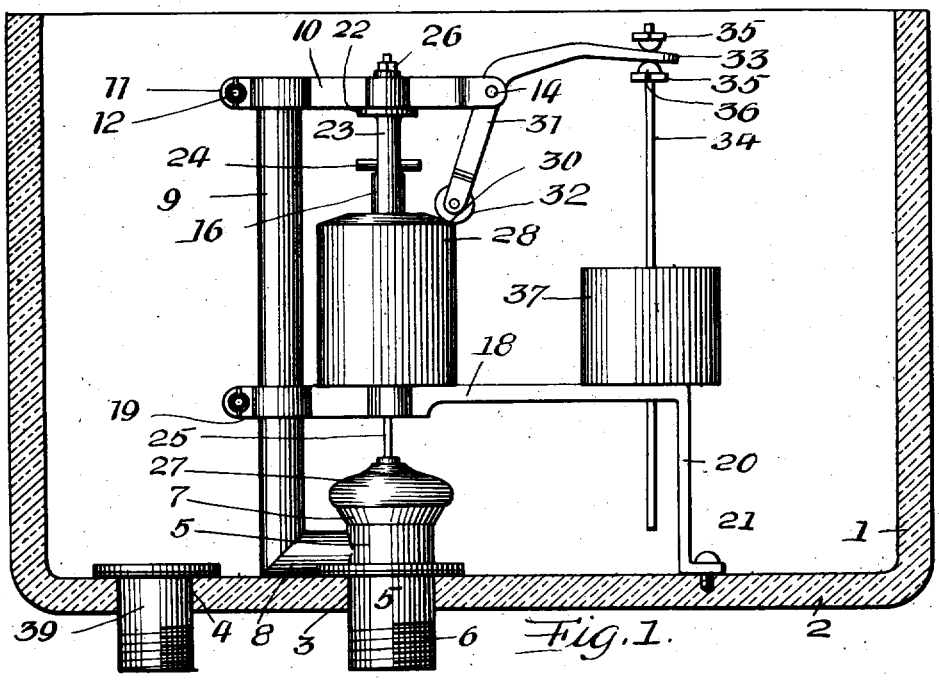

W. GUYTON.

FLUSHING APPARATUS.

APPLICATION FILED JUNE 15, 1911.

Reissued Dec. 5, 1911. 13,330.

WITNESSES:

Samuel Payne.

J. P. Appleman,

INVENTOR.

William Guyton

BY Horace G. Seitz his ATTORNEY.

COLUMBIA PLANOGRAPH CO., WASHINGTON, D. C.

UNITED STATES PATENT OFFICE.

WILLIAM GUYTON, OF AVALON, PENNSYLVANIA, ASSIGNOR OF ONE-HALF TO ROBERT STINSON, OF PITTSBURGH, PENNSYLVANIA.

FLUSHING APPARATUS.

13,330. Specification of Reissued Letters Patent. Reissued Dec. 5, 1911.

Original No. 976,870, dated November 29, 1910, Serial No. 552,607. Application for reissue filed June 15, 1911. Serial No. 633,450.

*To all whom it may concern:*

Be it known that I, WILLIAM GUYTON, a citizen of the United States of America, residing at Avalon, in the county of Allegheny and State of Pennsylvania, have invented a certain new and useful Improvement in Flushing Apparatus, of which the following is a specification, reference being had therein to the accompanying drawing.

This invention relates to a flushing apparatus for the bowls and hoppers of water closets, and the primary object of my invention is to provide a tank with an automatic valve adapted to be intermittently actuated to release a pre-determined quantity of water to flush the bowl or hopper.

Another object of this invention is to provide a flushing apparatus that can be advantageously used in connection with outdoor closets and by being regulated it will prevent the water of the flushing tank from freezing by from time to time releasing predetermined quantities of water which will also prevent the water within the hopper or bowl from freezing.

A further object of this invention is to provide a flushing tank with a primary and secondary float, the former controlling the operation of the latter in such a manner that the exhaust of water from a tank will be controlled by the secondary float.

A still further object of this invention is to accomplish the above results by an apparatus that is simple, durable, inexpensive to manufacture, applicable to various types of tanks, free from injury by ordinary use, and efficient as a flushing apparatus for various kinds of receptacles.

With the above and such other objects in view as may hereinafter appear as the invention is better understood, the same consists of the novel construction, combination and arrangement of parts to be hereinafter specifically described and then claimed.

Reference will now be had to the drawing forming a part of this specification, wherein:—

Figure 2:
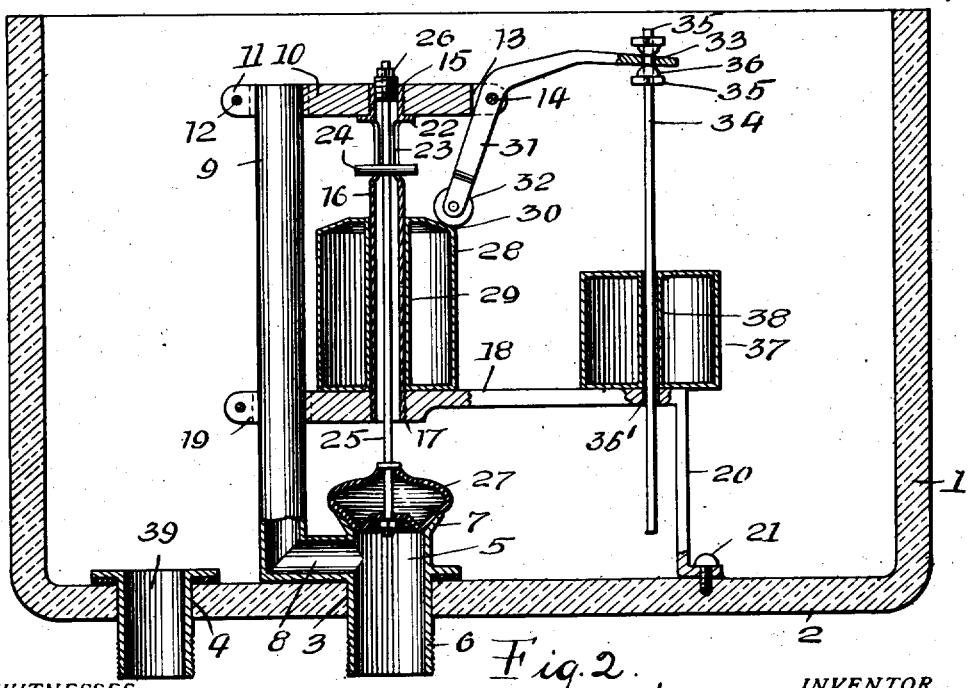

Figure 1 is a vertical longitudinal sectional view of a tank provided with my apparatus, and Fig. 2 is a similar view showing a portion of the apparatus in section.

In the accompanying drawing the reference numeral 1 denotes a tank made of porcelain, glass, or other suitable material not susceptible to any chemical action by the contents thereof. The bottom 2 of the tank is provided with an outlet opening 3 and an inlet opening 4, and extending through the former is a coupling pipe 5 having the lower end thereof threaded, as at 6 to receive an outlet pipe (not shown), while the upper end of the coupling pipe is flared or flanged to form a valve seat 7. Communicating with the coupling pipe 5 is the angular end 8 of a vertical overflow pipe 9 having the upper end thereof in proximity to the upper edges of the tank.

Detachably mounted upon the upper end of the overflow pipe 9 is a bracket 10, one end of the bracket being bifurcated to form a clamp 11 adapted to embrace the upper end of the pipe 9 and frictionally engage the same through the medium of a set screw 12, while the opposite end of said bracket is bifurcated, as at 13, and provided with a pivot pin 14. The bracket 10 intermediate the ends thereof is provided with an opening 15 having the walls thereof threaded to receive the upper threaded end of a tube 16, the lower end of said tube being screwed in an opening 17 provided therefor in a support 18. The support 18 has one end thereof clamped to the pipe 9, as at 19, similar to the clamped end of the bracket 10, while the opposite end of the support 18 is provided with a leg 20 secured to the bottom 2 of the tank 1 by a screw 21 or other fastening means.

The upper threaded end of the tube 16 is provided with a jam nut 22 adapted to engage the lower side of the bracket 10, and the upper end of said tube is provided with vertical oppositely-disposed slots 23 for a transverse pin 24 carried by a stem 25 extending through the tube 16. The upper end of the stem 25 is loosely mounted in a plug 26 mounted in the upper end of the tube 16, while the lower end of the stem is provided with a flexible valve 27 adapted to engage the seat 7 of the coupling pipe 5, said valve being of a conventional form made of rubber or other flexible and yieldable material.

Slidably mounted upon the tube 16 is a hollow cylindrical float 28 having a central vertical sleeve 29 adapted to receive the tube 16, said float having the upper end thereof beveled, as at 30, while the lower end of said float is adapted to normally rest upon the support 18.

Supported by the pivot pin 14 is an angularly-shaped locking lever 31 having the lower end thereof bifurcated and provided with an anti-friction revoluble wheel 32 adapted to engage the beveled surface of the float 28. The opposite end of the lever 31 is provided with an opening 33 for a vertical rod 34 loosely mounted in an opening 35 provided therefor in the support 18 adjacent to the leg thereof. The upper end of the rod having semi-spherical bearing surfaces 36 engaging the upper and under sides of the lever 31. Movably mounted upon the rod 34 is a cylindrical hollow float 37 having a central vertical sleeve 38 adapted to receive said rod, said float normally resting upon the support 18.

In the inlet opening 4 of the tank is mounted a coupling piece 39 to which is adapted to be connected a water supply pipe (not shown) adapted to have a suitable regulating valve for controlling the flow of water into the tank 1.

The operation of the flushing apparatus depends on the flow of water into the tank 1, and I will assume that the flow has been regulated to operate the flushing apparatus every few minutes. With the water entering the tank the lever of the water will gradually rise and elevate the float 37 upon the rod 34, until the upper end of the float 37 engages the lowermost nut 35 at the upper end of the rod 34. The lever 31 will then be moved and the wheel 32 thereof carried out of engagement with the upper end of the float 28. The buoyancy of the float will then cause the same to rise and impinge the transverse pin 24, raise this pin and the stem 25 and thereby unseating the valve 27. As the water flows through the coupling pipe 5 the float 28 will descend, also the float 37, and immediately upon the float 28 contacting with the support 18, the wheel 32 will be swung inwardly to engage the upper end of said float. This is accomplished by the outer end of the lever 31, the nuts 35 and the rod 34 being of a greater weight than the short arm of the lever. When the float 28 returns to its normal position the valve 27 is closed, and as water again accumulates in the tank, the float 37 will be carried upwardly and the same operation performed as just described.

As will be seen, the float 37 is movable under the rise and fall of the water within the tank without effecting any movement whatever of the lever 31, excepting when contact is made between the float and the nut 35, the lever and float then operating in unison during the rise of the water level to the point where the float 28 is tripped.

This tripping operation carries the wheel 32 out of the path of movement of float 28, the rise of the latter causing the side of the float to form a stop against a return movement of the lever to its normal position until the water level has receded to a point where said float 28 is positioned on the support 18. While the lever 31 will not return to its normal position, the float 37 will recede with the receding water level until it resumes its normal position. By this construction it will be understood that the weight placed on the lever and the wheel 32 is simply that of the longer arm of the lever and the rod 34, which weight remains unchanged at all times regardless of the height of the water level, the result being the practical elimination of all strains due to pressure or weight, and insuring the movements of the floats in practically single planes and without excessive friction of parts.

From the foregoing, it will be observed that I have devised a novel flushing mechanism that can be intermittently operated to flush the bowl or hopper and the operation of the mechanism controlled by simply regulating the flow of water to the flushing tank.

While in the drawings there is illustrated a preferred embodiment of the invention, it is to be understood that the structural elements thereof can be varied or changed, as to the size, shape and manner of assemblage, without departing from the spirit of the invention.

What I claim is:—

1. In a flushing apparatus, a tank having a water inlet and a water outlet, a valve adapted to normally close the outlet, a float arranged within said tank and adapted to elevate said valve and release the contents of said tank, movable means for normally retaining said float in inoperative position, and another float supported independently of and adapted to trip said means when the contents of the tank have reached a pre-determined level, the movements of said latter float and said means being in unison solely during the tripping operation.

2. In a flushing apparatus, a tank having a water inlet and a water outlet, a valve adapted to normally close the water outlet, a float adapted to elevate said valve and release the contents of said tank, a pivoted lever adapted to normally hold said float inactive, and another float supported independently of and normally disengaged from and adapted to engage said lever and move said lever to release the first mentioned float when the contents within said tank reach a pre-determined level, the movements of said latter float and of said lever being in unison solely during the releasing operation.

3. In a flushing apparatus, a tank having a water inlet and a water outlet, a valve adapted to normally close the outlet, a support arranged within said tank, a float normally seated upon said support and adapted to raise said valve and release the contents of said tank, means for normally retaining said float in inoperative position, and another float normally resting upon said support and adapted to be elevated by the inflowing water to trip said means and release the first mentioned float when the contents of said tank reach a pre-determined level, said latter float being free to return to its normal position independent of the movements of said means.

4. In a flushing apparatus, a tank having a water inlet and a water outlet, a valve adapted to normally close said outlet, a support arranged within said tank, a float normally resting upon said support and adapted to elevate said valve, a pivoted lever adapted to normally hold said float upon said support, and another float normally disengaged from said lever and adapted to be elevated by the contents of said tank to move said lever and release the first mentioned float, said latter float being free to return to its normal position independent of the movements of said means.

5. In flushing apparatus, the combination with a tank having a water outlet, a valve for said outlet, a float for moving said valve in one direction, of a freely-movable float adapted to travel with the rise and fall of the water level in the tank, and a controlling device located in the path of movement of said floats and normally adapted to retain the valve float against valve-opening movement, said device being moved to release the valve float when the freely-movable float has reached a pre-determined point to permit the valve float to open the valve, said freely-movable float having its return movements independent of the movements of the controlling device.

6. In flushing apparatus, the combination with a tank having a water outlet, a valve for said outlet, a float for moving said valve in one direction, of a freely-movable float adapted to travel with the rise and fall of the water level in the tank, and a controlling device located in the path of movement of said floats and normally adapted to retain the valve float against valve-opening movement, the normal position of the freely-movable float being below and out of contact with said device, the movement of the freely-movable float after contact with said device moving the latter to release the valve float and permit it to open the valve, said freely-movable float having its return movements independent of the movements of the controlling device.

7. In a flushing apparatus, a tank having a water inlet and a water outlet, an overflow pipe connecting with said water outlet, a valve adapted to normally close said water outlet, a support arranged within said tank and connecting with said overflow pipe, a secondary float normally resting upon said support and adapted to elevate said valve, a bracket carried by the upper end of said overflow pipe, a lever pivotally mounted at the outer end of said bracket and adapted to normally hold said secondary float upon said support, a rod carried by said lever and extending through said support, and a primary float movably mounted upon said rod and adapted to be elevated by the contents of said tank to move said lever and release the secondary float.

8. In a flushing apparatus, a tank having a water inlet and a water outlet, an overflow pipe in communication with said water outlet, a support arranged within said tank, a bracket carried by the upper end of said overflow pipe, a slotted tube arranged between said support and said bracket, a valve stem movably mounted in said tube, a valve carried by the lower end of said stem and adapted to normally close said water outlet, a transverse pin carried by said stem and protruding through the slots of said tube, a secondary float movably mounted upon said tube and adapted to engage said pin and elevate said valve, a lever pivotally supported by said bracket and adapted to normally retain said secondary float upon said support, a rod connected to the outer end of said lever and extending downwardly through said support, and a primary float movably mounted upon said rod and adapted to be elevated by the contents of said tank to move said lever and release said secondary float.

In testimony whereof, I affix my signature in the presence of two witnesses.

WILLIAM GUYTON.

Witnesses:
H. G. Seitz,
Max H. Srolovitz.

Copies of this patent may be obtained for five cents each, by addressing the "Commissioner of Patents, Washington, D. C."